Nov. 1, 1966  W. B. BROWN  3,282,805
METHOD OF DETECTING DISCONTINUITIES IN CABLE CONDUCTORS
Filed June 4, 1963

INVENTOR.
W. B. BROWN
BY
S. Gundersen
ATTORNEY

> 3,282,805
> METHOD OF DETECTING DISCONTINUITIES IN
> CABLE CONDUCTORS
> William B. Brown, Pasadena, Md., assignor to Western
> Electric Company, Incorporated, New York, N.Y., a
> corporation of New York
> Filed June 4, 1963, Ser. No. 285,519
> 6 Claims. (Cl. 204—1)

This invention relates to a method of detecting discontinuities in conductors and particularly to a method of detecting discontinuous conductors in a cable.

In modern cable manufacture it is not unusual for a cable to comprise literally hundreds of individual conductors. It is essential that any discontinuities in the cable be discovered prior to installation so that the cable will function properly when installed. It is a laborious and time-consuming task to check individually each conductor in a cable.

It is, therefore, a primary object of this invention to provide a method of readily detecting discontinuous conductors in a cable.

With this and other objects in view, the present invention contemplates plating one end of a cable by supplying current to the conductors of the cable so as to plate only the continuous conductor ends and then inspecting the conductor ends so as to detect any unplated conductor ends whereby discontinuous conductors in the cable are located.

Figure 1:
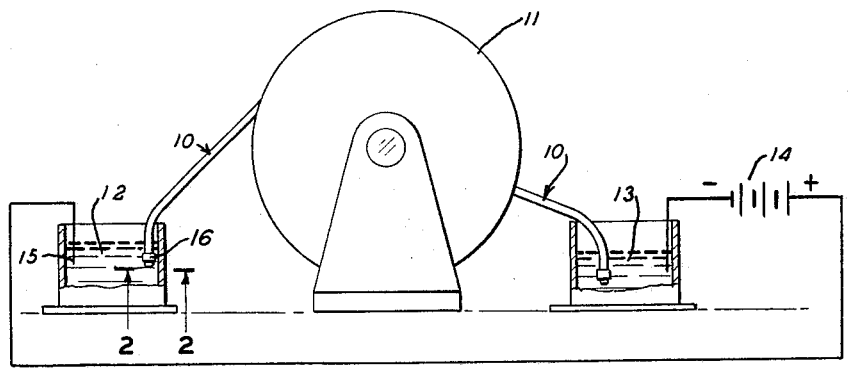
Figure 2:
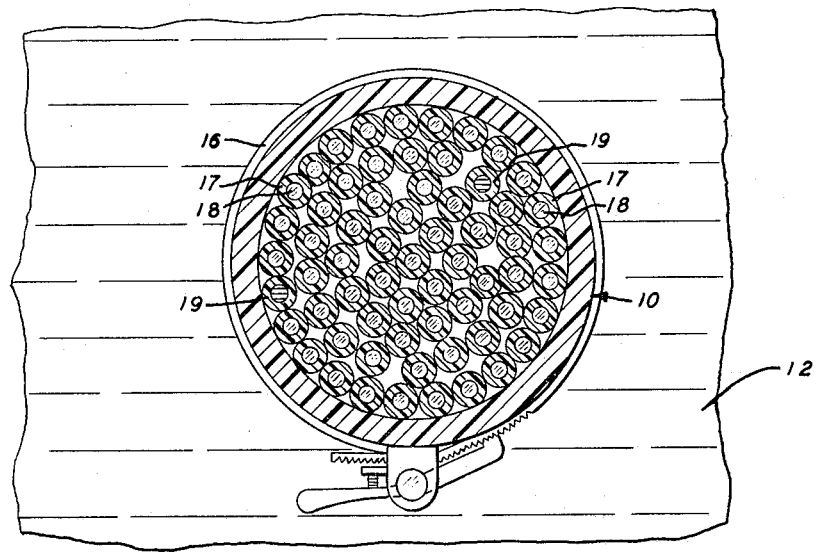

Other objects and advantages of the present invention will be apparent from the following detailed description when considered in conjunction with the accompanying drawings wherein:

FIG. 1 illustrates an apparatus for performing the method of the instant invention, and FIG. 2 is a sectional view of FIG. 1 taken along the lines 2—2.

Referring to FIG. 1, a multiconductor cable designated generally by the numeral 10 is carried by reel 11. The ends of conductors 17—17 on one end of the cable 10 are exposed and inserted in a plating bath 12. The ends of the conductors 17—17 on the other end of the cable 10 are exposed and immersed in a mercury bath 13.

Any desired material may be plated on the ends of the conductors 17—17 of the cable 10. It is advantageous to plate with a material which will contrast with the conductors 17—17 of the cable 10. The plating bath 12, for example, may be a cadmium or a silver-plating bath which would contrast well with the copper conductors 17—17 of the cable 10. Any conventional plating solution may be used such as solutions of silver nitrate or cadmium sulfate.

The mercury bath 13 is utilized so as to insure that current will be provided to each of the conductors 17—17 in the cable 10; however, any desired equivalent may be substituted for the mercury bath 13.

Any convenient source of power as, for example, a battery 14, may be provided for maintaining a potential difference between the plating bath 12 and the mercury bath 13. Where, for example, cadmium is to be plated on the ends of the conductors 17—17, the end of the cable 10 is immersed in the plating bath 12 of solutions of cadmium sulfate or silver nitrate and forms the cathode of the plating bath 12. In this instance an electrode 15 would be the anode of the plating bath 12. Thus, the cadmium or silver would be plated on the ends of the conductors 17—17 of cable 10 which conducted current from the mercury bath 13 to the plating bath 12. Therefore, the continuous conductors 17—17 would receive a coating of the plating material while in the plating bath 12.

As seen in FIG. 2, a clamp 16 is provided for restricting individual movements of the conductors 17—17 in the cable 10. The continuous conductors 17—17 would receive a plating coating 18 (FIG. 2) as a result of a flow of current through the conductors 17—17. Discontinuous conductors 19—19 would not receive such a coating of plating material. Thus, by visual inspection the discontinuous conductors 19—19 would be readily identified by the absence of such a coating similar to the coating 18. Optical means, such as a magnifying glass, could be provided for facilitating the visual inspection.

In preparing the cable 10 for the continuity test, the ends of the cable 10 are cut transversely, for example along a plane perpendicular to, or at some other angle with respect to, the longitudinal axis of the cable 10. The cut ends of the cable 10 are then polished so as to smooth and finish the exposed ends of the conductors 17—17. This is to facilitate the plating of metallic material on the ends of the conductors 17—17 and to facilitate distinguishment between the plated and unplated conductor ends. Polishing the end of the cable 10 results in the production of a more even plating of the ends of the continuous conductors 17—17 and results in a greater contrast between the plated and unplated conductor ends so as to facilitate the inspection of the cable 10. Further, a still greater contrast is advantageously obtained by immersing the plated end of cable 10 in a chemical solution for blackening the unplated ends of the conductors 17—17. For example, a solution of sodium sulfide may be used for this purpose.

Where it is desirable to cut the cable 10 at a relatively large angle with respect to the longitudinal axis of the cable, the cable end can be advantageously potted in a thermoplastic or thermosetting resin. The cut is then made through the resin material. For smaller cables this will permit the exposure of a greater cross-sectional area of the particular cable to the plating bath.

It is to be understood that the above-described arrangements are simply illustrative of the application of the principles of the invention. Numerous other arrangements may be readily devised by those skilled in the art which embody the principles of the invention and fall within the spirit and scope thereof.

What is claimed is:

1. A method of detecting discontinuities in conductors of a multiconductor cable, comprising the steps of:
   cutting one end of a cable transverse to the cable,
   polishing the cut end of the cable along a common plane so as to finish the cable,
   immersing the cut end of the cable in a plating bath,
   applying a direct current potential difference between the conductors of the cable and an anode contacting the plating bath whereby the ends of the continuous conductors in the plating bath will be plated with cations of the plating bath, and
   detecting the unplated ends of the discontinuous conductors.

2. In a method of detecting discontinuities in conductors in a multiconductor cable, comprising the steps of:
   polishing one end of the cable so as to finish the same,
   immersing the polished end of the cable in a plating bath,
   immersing the other end of the cable in a conductive medium,
   applying a direct current potential difference between an anode contacting the plating bath and the conductive medium so as to pass a current through the continuous conductors of the cable whereby the ends of the continuous conductors in the plating bath will be plated with cations of the plating bath, and
   detecting those ends of the conductors of the cable which are not plated whereby discontinuities in the conductors of the cable are determined.

3. A method of detecting discontinuities in conductors of a multiconductor cable, comprising the steps of:
   polishing one end of the cable so as to finish the same,
   immersing the polished end of the cable in a plating bath,
   immersing the other end of the cable in a mercury bath,
   applying a direct current potential difference between the mercury and an anode contacting the plating bath so as to pass a current through the conductors of the cable whereby the ends of the continuous conductors are plated with cations of the plating bath, and
   inspecting the plated end of the cable so as to detect those conductors whose ends are unplated.

4. A method of detecting discontinuities in conductors of a multiconductor cable, comprising the steps of:
   cutting the ends of the cable transverse to the longitudinal axis of the cable,
   polishing one end of the cable so as to finish the end of the cable,
   immersing the polished end of the cable into a cadmium-plating bath,
   immersing the other end of the cable into a mercury bath,
   applying a direct current potential difference between the mercury and an anode contacting the cadmium-plating bath so as to pass a current through the continuous conductors of the cable whereby the ends of the continuous conductors immersed in the plating bath are plated with cadmium, and
   detecting those conductor ends which are unplated.

5. A method of detecting discontinuities in conductors of a multiconductor cable, comprising the steps of:
   cutting the ends of the cable transversely to the longitudinal axis of the cable,
   polishing one end of the cable so as to finish the end of the cable,
   immersing the polished end of the cable into a silver-plating bath,
   immersing the other end of the cable in a mercury bath,
   applying a direct current potential difference between the mercury and an anode contacting the silver-plating bath so as to pass a current through the continuous conductors of the cable whereby the ends of the continuous conductors immersed in the plating bath are plated with silver, and
   detecting those conductor ends which are unplated.

6. A method of detecting discontinuities in conductors of a multiconductor cable, comprising the steps of:
   cutting the ends of the cable transversely to the longitudinal axis of the cable,
   polishing one end of the cable so as to finish the end of the cable,
   immersing the polished end of the cable into a plating bath,
   immersing the other end of the cable in a conductive bath,
   applying a direct current potential difference between an anode contacting the plating bath and the conductive bath so as to pass a current through the continuous conductors of the cable and the conductive bath whereby the ends of the continuous conductors immersed in the plating bath are plated with cations of the plating bath,
   immersing the plated end of the cable into a chemical solution for darkening the unplated conductor ends, and
   inspecting the plated end of the cable to detect any unplated conductor ends.

No references cited.

JOHN H. MACK, *Primary Examiner.*

T. H. TUNG, *Assistant Examiner.*